United States Patent
Sanders et al.

(10) Patent No.: US 7,644,251 B2
(45) Date of Patent: Jan. 5, 2010

(54) NON-VOLATILE SOLID-STATE MEMORY CONTROLLER

(75) Inventors: Richard Sanders, Hutto, TX (US); David C. Baker, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 281 days.

(21) Appl. No.: 11/312,852

(22) Filed: Dec. 19, 2005

(65) Prior Publication Data

US 2007/0143569 A1 Jun. 21, 2007

(51) Int. Cl.
- G06F 9/26 (2006.01)
- G06F 9/34 (2006.01)
- G06F 13/00 (2006.01)
- G06F 13/28 (2006.01)

(52) U.S. Cl. .................... 711/203; 711/103
(58) Field of Classification Search .................. None
See application file for complete search history.

(56) References Cited

U.S. PATENT DOCUMENTS

| | | | |
|---|---|---|---|
| 4,763,244 A * | 8/1988 | Moyer et al. ............... 711/206 |
| 5,388,083 A | 2/1995 | Assar et al. | |
| 5,479,638 A | 12/1995 | Assar et al. | |
| 5,485,595 A | 1/1996 | Assar et al. | |
| 5,630,093 A | 5/1997 | Holzhammer et al. | |
| 5,907,856 A | 5/1999 | Estakhri et al. | |
| 5,963,983 A | 10/1999 | Sakakura et al. | |
| 6,349,380 B1 * | 2/2002 | Shahidzadeh et al. ....... 712/211 |
| 6,393,513 B2 | 5/2002 | Estakhri et al. | |
| 6,477,612 B1 | 11/2002 | Wang | |
| 6,711,059 B2 | 3/2004 | Sinclair et al. | |
| 2004/0064672 A1 | 4/2004 | Fleming et al. | |
| 2004/0194097 A1 | 9/2004 | Spencer | |
| 2005/0005059 A1 | 1/2005 | Tanaka et al. | |
| 2005/0010739 A1 | 1/2005 | Rozas et al. | |
| 2005/0155019 A1 | 7/2005 | Levine et al. | |
| 2005/0182903 A1 | 8/2005 | Kinter et al. | |
| 2005/0210451 A1 | 9/2005 | Dimpsey et al. | |
| 2006/0206687 A1 * | 9/2006 | Vega ........................... 711/206 |
| 2007/0005928 A1 * | 1/2007 | Trika et al. .................. 711/202 |

FOREIGN PATENT DOCUMENTS

| WO | WO 99/38066 A1 | 7/1999 |
| WO | WO 2005/036401 A2 | 4/2005 |
| WO | WO 2005/066972 A1 | 7/2005 |

* cited by examiner

Primary Examiner—Kevin Verbrugge
Assistant Examiner—Eric S Cardwell
(74) Attorney, Agent, or Firm—Toler Law Group

(57) ABSTRACT

A controller includes a volatile random access memory and translation hardware. The volatile random access memory includes a table having at least one entry. The at least one entry includes a portion of a physical address of a memory location at a NAND flash non-volatile solid-state memory. The volatile random access memory is accessible to the translation hardware. The translation hardware is configured to sum binary data bits of a portion of a logical address and a pointer value to determine a random access memory address of the at least one entry and is configured to determine the portion of the physical address of the memory location at the NAND flash non-volatile solid-state memory based at least in part on the random access memory address of the at least one entry.

26 Claims, 6 Drawing Sheets

NON-VOLATILE SOLID-STATE MEMORY CONTROLLER

FIELD OF THE DISCLOSURE

This disclosure, in general, relates to non-volatile solid-state memory device controllers and methods for controlling such non-volatile solid-state memory devices.

BACKGROUND

Increasingly, consumers are demanding portable electronic devices, such as personal digital assistants (PDAs), MP3 players, portable storage systems, advanced wireless telephones, cameras, and other handheld devices. Traditional non-volatile storage mediums, such as hard drives, floppy drives and other storage devices, are generally unsuitable for portable devices. These typical devices generally have moving parts and, as such, are subject to mechanical failure. In addition, such devices are bulky and consume a large amount of energy. As a result, developers are turning to solid-state non-volatile memory devices, such as NAND flash memory, for use in portable products.

Typically, the solid-state non-volatile memory devices organize data in blocks, each block including a set of pages. Often, a block is the smallest unit of memory that may be erased and a page is the smallest unit of memory that may be written. Data may be read from locations within a page.

However, non-volatile solid-state memory devices, and, in particular, NAND flash memory devices, are likely to lose the ability to store data with increasing numbers of read and write operations. To reduce wear among data blocks on a memory device, algorithms are typically employed when writing data to balance usage of the data blocks, for example, by writing to the least used data block. In this manner, block and page usage may be more evenly distributed. In addition, algorithms may be employed to test blocks to determine whether the blocks are functional or corrupted. Poorly functioning blocks may be placed on a list of unusable or bad blocks. Data previously stored on such blocks is typically moved to other usable and functioning blocks.

As a result of the usage balancing and block testing, the physical address of a particular data set may change. To compensate for this change, manufacturers of controllers for such non-volatile solid-state memory devices have developed logical-to-physical address translators. Host devices accessing the solid-state non-volatile memory devices may communicate with the controller using a logical address. The controller translates the logical address into a physical address associated with locations on the non-volatile solid-state memory device. Generally, such translation is performed by software stored on the controller, which accesses a table that is generally stored on the non-volatile solid-state memory device and may be transferred to the controller on demand. In general, such software implementations are slow because of data transfer rates of the table and lengthy logical processes to ascertain a physical address associated with a logical address.

As such, an improved system and method for accessing data stored on a solid-state non-volatile memory device would be desirable.

DETAILED DESCRIPTION OF THE DRAWINGS

Figure 1:
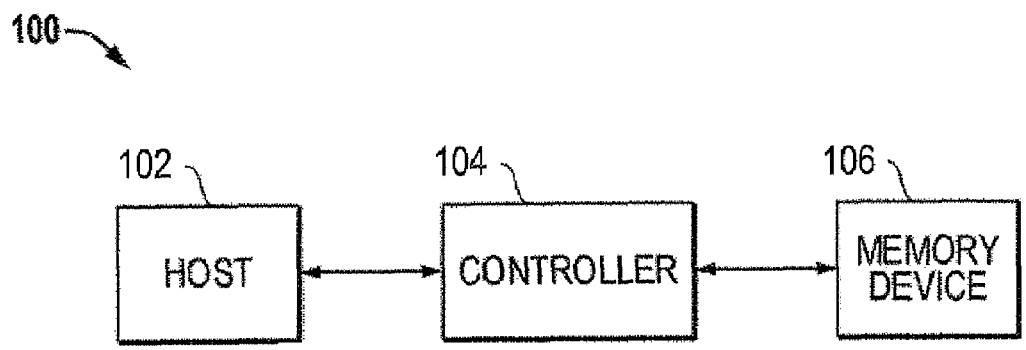
FIG. 1 includes an illustration of an exemplary system for storing data.

In a particular embodiment, a device includes a non-volatile solid-state memory device and a controller configured to read, write and erase data stored on the non-volatile solid-state memory device. The controller includes random access memory (RAM) that includes one or more translation tables. The translation table includes an entry configurable to store at least a portion of a physical address of a location on the non-volatile solid-state memory device. In an exemplary embodiment, the entry has an address at least partially corresponding to a portion of the logical address and stores at least a portion of the physical address associated with the logical address. In addition, the device may include an interface to a host device or a processor that behaves as a host device. The host device communicates with the controller to access data stored on the non-volatile solid-state memory device. In a particular example, the non-volatile solid-state memory device is a flash memory device, such a NAND flash memory device. In an exemplary embodiment, the device is a portable storage device, such as a thumb drive, or a portable media player, such as an MP3 player or portable video player.

In a particular embodiment, a controller includes a volatile random access memory and translation hardware. The volatile random access memory includes a table having at least one entry. The at least one entry includes a portion of a physical address of a memory location at a NAND flash non-volatile solid-state memory. The volatile random access memory is accessible to the translation hardware. The translation hardware is configured to sum binary data bits of a portion of a logical address and a pointer value to determine a random access memory address of the at least one entry and is configured to determine the portion of the physical address of the memory location at the NAND flash non-volatile solid-state memory based at least in part on the random access memory address of the at least one entry.

In another exemplary embodiment, a controller includes a volatile random access memory, a register, and translation hardware. The volatile random access memory includes a first table and a second table. The first table is associated with a first portion of a logical address and includes a first entry. The second table is associated with a second portion of the logical address and includes a second entry. The second entry includes a portion of a physical address of a location at a flash non-volatile solid-state memory. The register includes a reference pointer associated with the first table. The register and the volatile random access memory are accessible to the translation hardware. The translation hardware is configured to sum the first portion of the logical address and the reference pointer to determine a random access memory address. The random access memory address is associated with the first entry. The translation hardware is configured to determine the portion of the physical address of the location at the flash non-volatile solid-state memory by accessing the second entry.

In a further exemplary embodiment, a device includes NAND flash non-volatile solid-state memory and a controller. The controller includes volatile random access memory and translation hardware. The volatile random access memory includes a table having at least one entry. The at least one entry includes a portion of a physical address of a memory location at the NAND flash non-volatile solid-state memory. The volatile random access memory is accessible to the translation hardware. The translation hardware is configured to sum binary data bits of a portion of a logical address and a pointer value to determine a random access memory address of the at least one entry at the volatile random access memory and is configured to determine the portion of the physical address of the memory location at the NAND flash non-volatile solid-state memory.

In an additional embodiment, a method of accessing non-volatile solid-state memory includes summing data elements of a first portion of a logical address and a first pointer to determine a first address at a volatile random access memory of a first table entry of a first table, accessing the volatile random access memory based on the first address to determine a second pointer, summing data elements of a second portion of the logical address and the second pointer to determine a second address at the volatile random access memory of a second table entry of a second table, and accessing the volatile random access memory based on the second address to determine a portion of a physical address of a location at the non-volatile solid-state memory.

In an embodiment, the device may be configured to communicate with a host device or may be integrated with the host device. FIG. 1 includes an illustration of an exemplary system 100 that includes a controller 104 and a memory device 106. The memory device 106 is responsive to the controller 104. In addition, the system 100 may include a host device 102 in communication with the controller 104. In an exemplary embodiment, the host device 102 is a separate device that communicates with the controller 104 via a serial interface, such as a universal serial bus (USB) interface. In another exemplary embodiment, the host 102 and the controller 104 may form a portion of a system-on-a-chip and may be implemented in a combination of software and hardware. In a further example, the controller 104 may be a processor. The host device 102, the controller 104, and the memory device 106 may be housed together, or separately, or may be remotely housed.

In an exemplary embodiment, the system 100 is a portable device that includes the controller 104 and the memory device 106. The portable device may be, for example, a portable memory device, such as a thumb drive including flash memory. In another example, the portable device may be a portable media player, such as an MP3 player or portable video player. Such portable devices may be configured to store data, and, in particular, may be configured to store media data, such as audio or video data.

In a particular embodiment, the memory device 106 is a non-volatile solid-state memory device, and, in particular, is a flash memory device. For example, the memory device 106 may be a NAND flash memory device.

Based on the nature of the non-volatile solid-state memory device 106, the physical address of particular data stored on the non-volatile solid-state memory device 106 may change in response to balancing algorithms and block testing algorithms. As such, the controller 104 may implement a translation between a logical address and the physical address of a location on the non-volatile solid-state memory device 106. A particular physical address indicates a particular location on the non-volatile solid-state memory device 106. In contrast, the logical address of a particular set of data is constant relative to the changing physical address of that particular set of data. As such, a logic address space is configured to provide a view of the address space that does not change in response to changes and adjustments to the physical address space, such as changes in adjustments resulting from balancing algorithms and block testing algorithms.

The logical address space is contrasted with virtual address spaces referenced by processes being executed by processors. Often, memory management units are employed to move data and instructions from non-volatile memory to random access memory (RAM) more quickly accessed by processors. Such memory management units provide a translation between the virtual address space and a logical address space. In references discussing memory management units in relation to traditional magnetic storage devices, the logical address space is often referred to as a physical address space of the traditional magnetic media. However, in systems relying on solid-state non-volatile memory devices, such as NAND flash memory devices, the memory management unit references a logical address space provided by a controller. The logical address space is translated to a physical address space by the controller 104. In a particular embodiment, the logical address space is provided by the controller 104 to emulate the physical address space of traditional magnetic media.

In an embodiment, the controller 104 includes one or more translation tables accessible to provide at least a portion of a physical address in response to at least a portion of a logical address. For example, the translation table may include at least one entry having an address that at least partially corresponds to a portion of a logical address and stores at least a portion of the physical address. Using the portion of the physical address, the controller 104 may determine a physical address of a location on the memory device 106 and interact with the memory device 106 to read, write, or erase data.

For example, the controller 104 may receive a logical address and a request to retrieve data from a location associated with the logical address. The controller 104 may access the translation table using at least a portion of the logical address to determine at least a portion of a physical address. Based at least in part on the portion of the physical address, the controller 104 may determine a physical address and access the memory device to retrieve the data from the location associated with the physical address.

In another example, the controller 104 may receive data and a logical address at which to store the data from the host device 102. The controller may determine a physical address at which to store the data and may interact with the solid-state non-volatile memory device 106 to store the data at a location associated with the physical address. In addition, the controller 104 may update a translation table to associate an entry corresponding to at least a portion of the logical address with at least a portion of the physical address.

Figure 2:
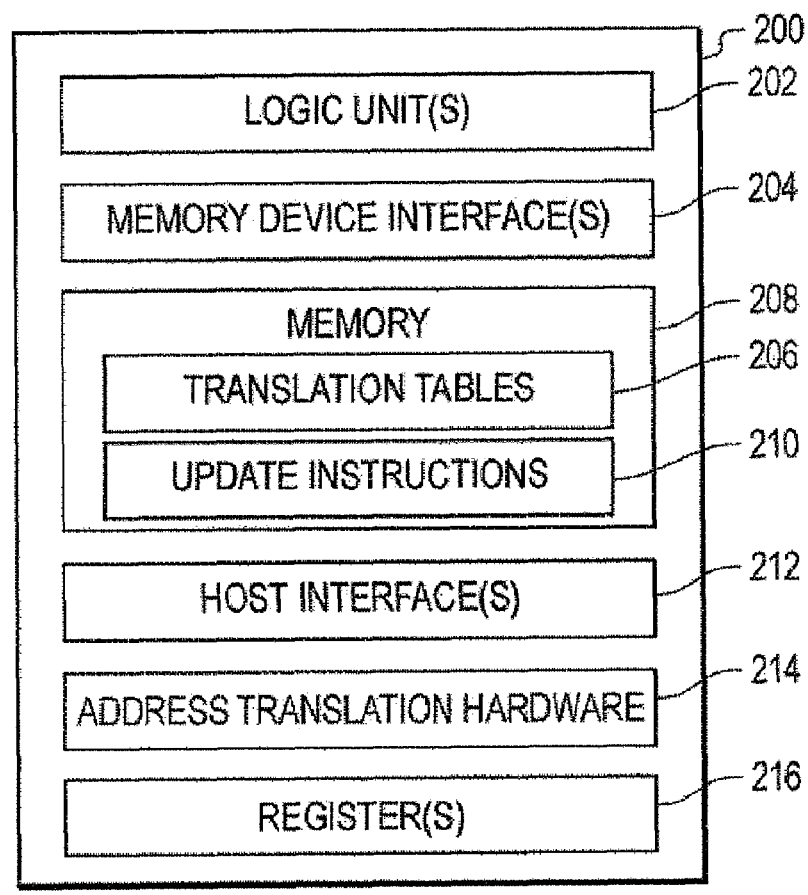
FIG. 2 includes an illustration of an exemplary controller of non-volatile solid-state memory devices for use in a system, such as the exemplary system illustrated in FIG. 1.

In an exemplary embodiment, FIG. 2 includes an illustration of an exemplary controller 200 for use in a system, such as the exemplary system illustrated in FIG. 1. The controller 200 includes one or more logical units 202, one or more memory device interfaces 204, address translation hardware 214, one or more registers 216, and a memory 208, such as random access memory (RAM). The memory 208 may include one or more translation tables 206 and update instructions 210. In an example, the update instructions 210 may be uploaded to the controller 200 in response to controller operations and deleted otherwise. In addition, the translation tables 206 may be loaded into the memory 208 on demand or upon device startup. For example, translation tables 206 may be generated upon device startup based on data stored with blocks of a non-volatile solid-state memory.

The logical unit 202 may function to manage the translation table 206, control a non-volatile solid-state memory device via the memory device interface 204, and interact with host devices via the host interface 212. Portions of the logical unit 202 may be implemented in hardware, software, or combinations thereof. In addition, logical units 202 may perform a function, such as redundancy code checking, error correction code encoding and decoding, block management including usage balancing and testing for inoperable blocks, and manipulating communications received from and sent to a host device via the host interface 212. In a particular example, the logical unit 202 may be configured to execute software instructions, such as update instructions 210.

The memory device interface 204 may include an interface configured to communicate with non-volatile solid-state memory devices, such as NAND flash memory devices. In particular, the memory device interface 204 may include data lines, control lines, address lines, and ready/busy lines. The controller 200 may include one or more memory device interfaces 204 that are configured based on the configuration of the non-volatile solid-state memory device with which the memory device interface 204 is configured to communicate. Memory devices produced by various manufacturers are responsive to communications and interfaces following different protocols and command sets. It is understood, that the controller 200 may be configured with software, particular logic units 202 and specific memory device interfaces 204 in compliance with one or more of the memory device specifications of the manufacturers of non-volatile solid-state memory devices.

In an exemplary embodiment, the controller 200 includes host interfaces 212. For example, the controller 200 may include a host interface 212, such as a serial host interface, such as a universal serial bus (USB) interface. The logic unit 202, and optionally, software executable by the logic unit may be configured to communicate with a host device using various communication protocols, such as mass storage class (MSC) or media transfer protocol (MTP), based on the communication protocol compatible with the host device. In general, the host device will provide, via a communication, a request to store data at, retrieve data from, or erase data at the memory device. The communication typically includes a logical address that the controller 200 translates into a physical address with which the controller 200 may access the non-volatile solid-state memory device.

In an exemplary embodiment, the controller 200 includes the translation table (TT) 206 that is accessible to translate at least a portion of the logical address to at least a portion of a physical address. In a particular embodiment, the translation table 206 includes a set of entries, each entry storing binary bits of a portion of an address. The portion of the address may be a portion of a physical address of a location at a memory device or a portion of an address of an entry in a translation table 206 at the memory 208.

In a particular embodiment, the address translation hardware 214 determines an address of an entry of the translation table 206 based on at least a portion of a logical address and a pointer stored in a register 216. Based on a value stored in the entry of the translation table 206, the address translation hardware 214 determines the physical address based at least in part on a second portion of the logical address and stores the physical address in memory 208 or in a register 216, such as a physical address register.

Figure 8:
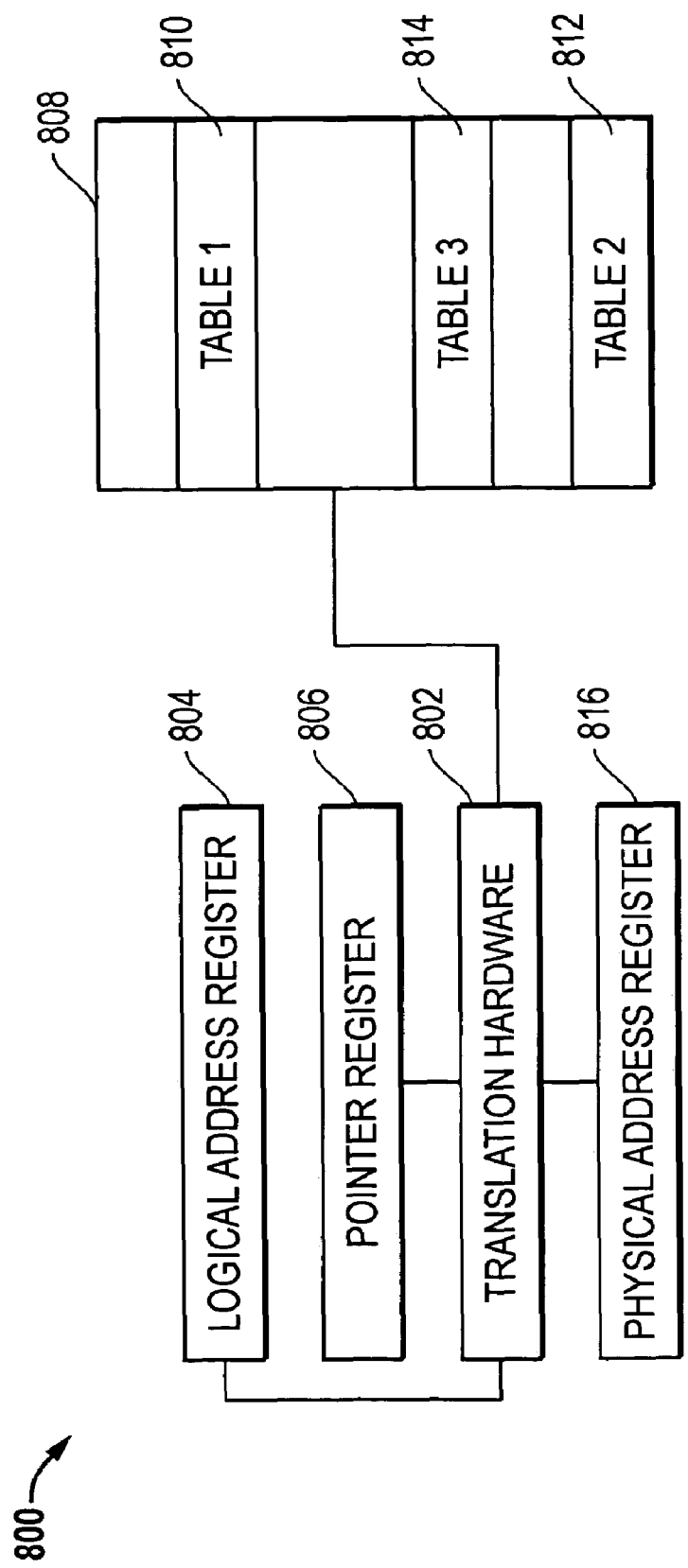
FIG. 8 includes an illustration of an exemplary controller of non-volatile solid-state memory devices for use in a system, such as the exemplary system illustrated in FIG. 1.

For example, FIG. 8 includes an illustration of an address translation portion of a controller. The translation portion 800 of the controller includes translation hardware 802. The translation hardware 802 includes circuitry having a specific function (i.e., address translation) and functions substantially without software. The translation portion 800 includes a logical address register 804, a pointer register 806, and a physical address register 816, each accessible to the translation hardware 802. In addition, a random access memory (RAM) 808 is accessible to the translation hardware 802. The random access memory (RAM) 808 includes at least one translation table, such as table 1 (810), and may include more than one translation table, such as tables 2 and 3 (812 and 814, respectively).

When the translation portion 800 receives a logical address, the logical address is stored in logical address register 804. To determine a physical address associated with the logical address, the translation hardware 802 accesses a portion of the logical address register 804, shifts data elements (e.g., binary data bits) of the portion of the logical address, and sums the data elements and a pointer stored in pointer register 806. The sum of the data elements and the pointer indicate an address of an entry of table 1 (810) located at the RAM 808. The entry includes a portion of an address. The address may be a physical address of a location at a non-volatile solid-state memory device associated with the logical address. Alternatively, the address may be the address of an entry in another table, such as table 2 (812) or table 3 (814), at the RAM 808. When the address is associated with an entry of another table, the translation hardware accesses a second portion of the logical address register 804, shifts data elements associated with the second portion, and sums data elements of the second portion and a pointer stored in the entry of table 1 (810). The sum of the data elements of the second portion and the pointer indicate an address of an entry in another table, such as tables 2 and 3 (812 and 814, respectively). In an exemplary embodiment, the entry of the other table includes a portion of the physical address.

Once a portion of the physical address has been located, the translation hardware 802 accesses the logical address register 804 to locate another portion of the logical address, such as a portion including the lowest significant address bits. The translation hardware 802 sums the lowest significant address bits and data elements (e.g., binary data bits) of the portion of the physical address to determine the physical address. Optionally, the binary bits of the portion of the physical address are shifted prior to summing. The physical address is stored at the physical address register 816.

Returning to FIG. 2, when the logical address is not associated with a physical address, an error or a zero output may be produced, indicating to the controller 200 an absence of an association with a physical address. For example, a table entry having an address at least partially corresponding to the portion of the logical address may be absent or a pointer stored in the entry may indicate an absence of the table or entry, such a NULL pointer. In response and based at least in part on the type of communication received from the host, the controller 200 may provide an error to the host, may determine a physical address by other methods, or may establish a new association of a logical address to a physical address. When the pointer indicates an absence of the corresponding table, the table may be loaded into memory 208.

While the above discussion describes determining a portion of a physical address from a portion of a logical address in relation to a single translation table, a set of translation tables may be used to determine a physical address based on portions of a logical address. Each translation table of the set of translation tables may be stored at the memory 208. Alternatively, more recently accessed translation tables may be stored at the memory 208 and the remaining tables may be loaded to the memory 208 from a non-volatile solid-state memory (not shown) as referenced.

In a particular embodiment, the controller 200 includes a translation table associated with higher significant address bits and a set of translation tables associated with lower significant address bits. An entry within the higher significant address bit translation table may associate a portion of a logical address that has higher significant address bits with one translation table of the set of lower significant address bit translation tables. In this manner, specific portions of the logical address may be associated with separate translation tables, resulting in selection of a particular physical address or portions thereof. In an example, the translation tables may be updated separately. Thus, when data is written to a new block of a non-volatile solid-state memory device, but in relatively similar page locations, a lower significant address bit translation table can be edited to reflect the new physical address without modifying the higher significant address bit translation table. Further, infrequently used tables may be removed from the memory 208 and loaded when referenced, reducing the size of the memory 208.

In another exemplary embodiment, the controller 200 may include a first table in the memory 208 that provides logical-to-entry mapping and a separate set of translation tables (TT) 206 that provide logical-to-physical address mapping. When a logical address is received, the logic units 202 in the controller 200 may provide the logical address to the address translation hardware 214. The address translation hardware 214 may access the logical-to-entry table using a higher address bit portion of the logical address to select a particular translation table 206 to access. Using another portion (e.g., a lower address bit portion) of the logical address, the translation hardware 214 may access an entry of the selected table and may determine a physical address or a portion thereof, such as a block and page of the physical address. Another portion of the logical address may be designated as an offset portion to directly provide offset data of the physical address.

Figure 3:
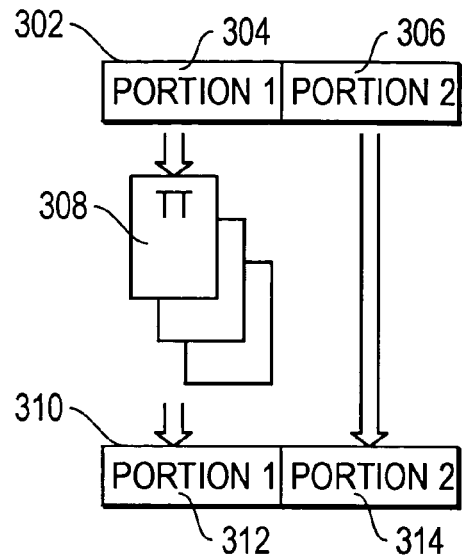
FIGS. 3 and 4 include illustrations of exemplary logical-to-physical address translations.
Figure 4:
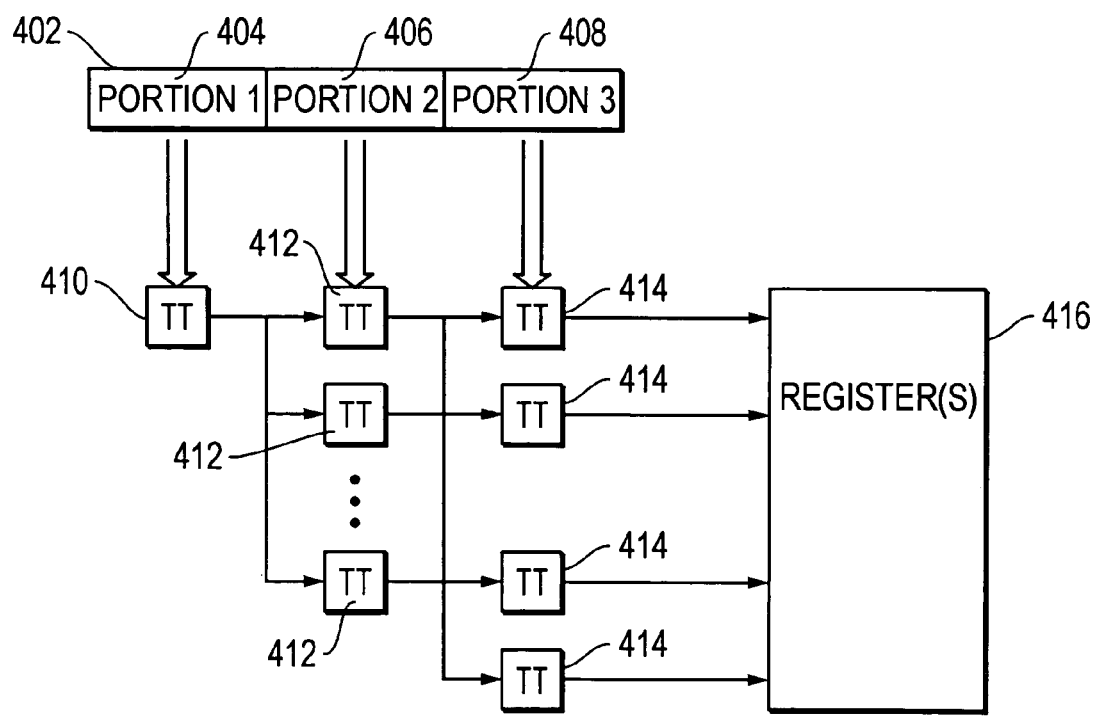

FIGS. 3 and 4 illustrate exemplary methods for determining a physical address based at least in part on portions of a logical address. For example, FIG. 3 illustrates determination of a physical address 310 based on portions of a logical address 302. For example, the logical address 302 may include a portion 304 and a portion 306. In a particular example, the portion 304 may include address bits that are more significant than the address bit of the portion 306. In an embodiment, the portion 304 may be considered a block address portion or a block and page address portion of the logical address 302 and the portion 306 may be considered an offset portion of the logical address 302. As illustrated, the portion 304 is used to determine an address of an entry in the one or more translation tables 308. For example, the portion 304 may be applied as a whole to determine a single entry of a translation table or may be subdivided and used to determine entry addresses of entries in sets of translation tables 308.

Based at least in part on the value of the bits within the portion 304, one or more entries within the translation tables 308 may be addressed. In response, the translation tables 308 may produce a portion 312 of a physical address 310. For example, the portion 312 of the physical address 310 may include more significant address bits than the portion 314 of the physical address 310 and may be a block portion or a block and page portion of the physical address 310 determined based at least in part on the block or block and page portion 304 of the logical address 302.

As illustrated in FIG. 3, the portion 306 of the logical address 302 may be used directly to form the portion 314 of the physical address 310. In a particular embodiment, the portion 306 of the logical address 302 is indicative of an offset within a page stored on a non-volatile solid-state memory device. As such, the offset may be applied directly as an offset included in the portion 314 of the physical address 310. For example, the portion 306 of the logical address may be appended to the portion 312 of the physical address to form the complete physical address, including portions 312 and 314.

FIG. 4 includes an illustration of an exemplary method of determining a physical address. For example, portions (404, 406 and 408) of a logical address 402 may be associated with several sets (410, 412, and 414) of translation tables (TT). In a particular embodiment, a portion 404 of the logical address 402 correlates with entries of translation table 410. The translation table 410 may include an entry that is addressable by the sum of a pointer and the binary bits of the portion 404. As a result, the entry having the positive correlation may indicate one of the set of translation tables 412, such as providing a pointer associated with one of the set of translation tables 412. When a table indicated by an entry is not located at the memory, the table may be loaded into the memory. The selected translation table of the set of translation tables 412 may use a portion 406 of the logical address 402 to address an entry within the translation table 412. The entry having a positive correlation with the address bits of the portion 406 may indicate a further translation table, such as one of the translation tables 414. The selected translation table 414 may indicate a physical address or a portion of the physical address based at least in part on the portion 408 of the logical address 402. For example, an entry in the selected translation table 414 may indicate a positive correlation with the address bits of the portion 408, resulting in the determination of a portion of a physical address stored with the entry. Once the physical address is determined, the physical address may be stored in memory or a register 416.

In the event that a correlation is not determined in the translation tables 410, 412 or 414, the controller may determine a new relationship between an unused physical address and the logical address provided by the host communication. For example, the controller may determine a physical address based in part on a balancing algorithm and a list of unusable blocks. Once the physical address is determined, the translation tables 410, 412 and 414 may be updated to reflect the new association between the physical address and the logical address.

Alternatively, a software implementation of address translation may be used to provide a pointer to a table selected based on a first portion of a logical address. Accordingly, the address translation hardware may used to add binary bits associated with a second portion of the logical address and the pointer to determine an entry in the table including a portion of a physical address associated with the logical address. The address translation hardware may add the binary bits of the portion of the physical address and a third portion of the logical address to determine the physical address.

Figure 5:
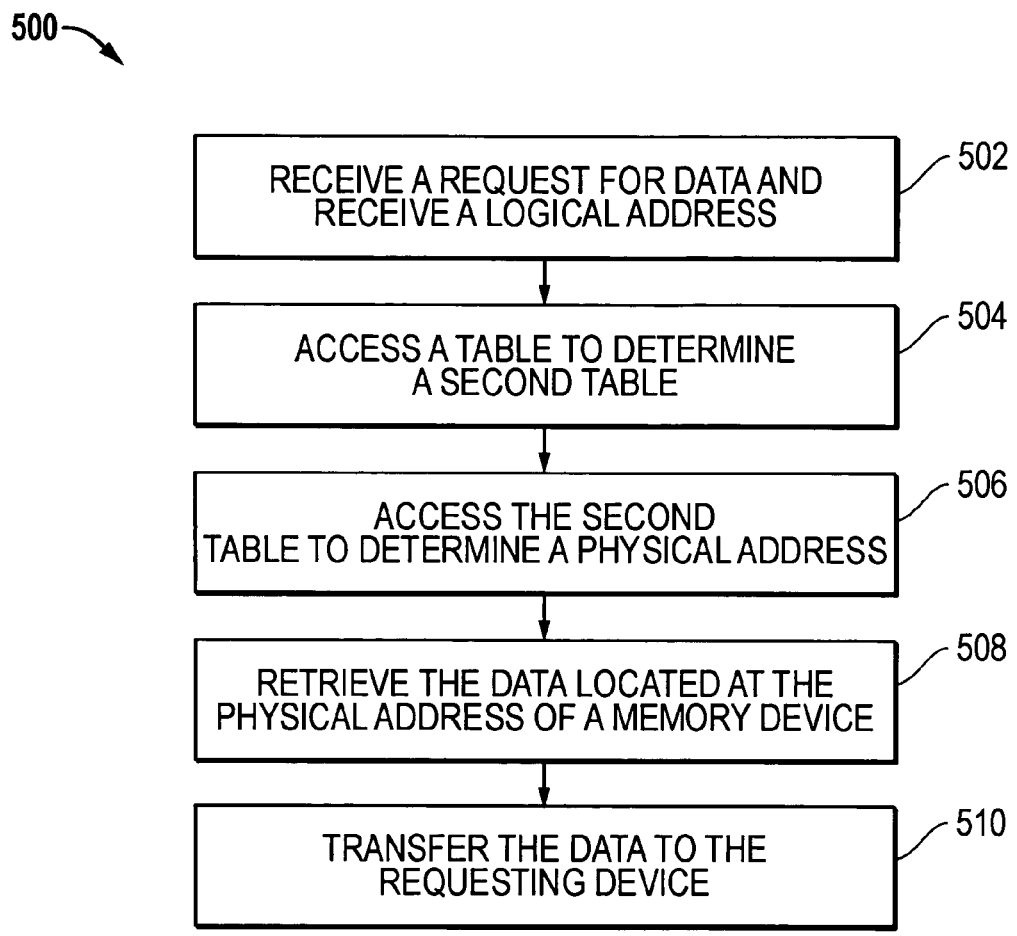
FIGS. 5, 6, and 7 include illustrations of exemplary methods for use by a system, such as the exemplary system illustrated in FIG. 1.

FIG. 5 includes an illustration of an exemplary method 500 for accessing data stored on a non-volatile solid-state memory device. For example, the method 500 includes receiving a request for data located at a logical address and receiving the logical address, as illustrated at 502. A controller may access a table to determine a second translation table based at least in part on a portion of the logical address, as illustrated at 504. For example, the logical address may include a block portion or a block and page portion of the address and an offset. Binary bits of the block portion of the logical address may be added to a pointer to define an address of an entry in the table, which stores a second pointer that indicates a second translation table. A second portion of the logical address may be applied to the second translation table to determine a physical address, as illustrated at 506. For example, binary bits of the second portion may be added to the second pointer to define an address of a second entry. As such, when a relationship or association has been established in the translation tables between the portion of the logical address and a physical address, the entry within the one or more translation tables is addressed in part by binary bits of the portion of the logical address and stores at least a portion of the physical address. In an example, the controller accesses a first table using a first portion of the logical address, such as a high significant bit portion of the logical address. The first table may be a RAM based table that references a set of translation tables. Based on the pointers stored in the entries of the first table, the controller may access a selected translation table (from the set of translation tables) to determine a physical address or a portion thereof based at least in part on a second portion of the logical address.

Based at least in part on this determination of a portion of a physical address, the controller may determine the physical address of the data requested by a host device. Using a command set and communication protocol associated with the non-volatile solid-state memory device, the controller retrieves the data from the location on the non-volatile solid-state memory device associated with the physical address, as illustrated at 508. Once the controller has retrieved the data from the non-volatile solid-state memory device, the controller may prepare a communication to a requesting host device and transfer the data to the host device, as illustrated at 510.

Figure 6:
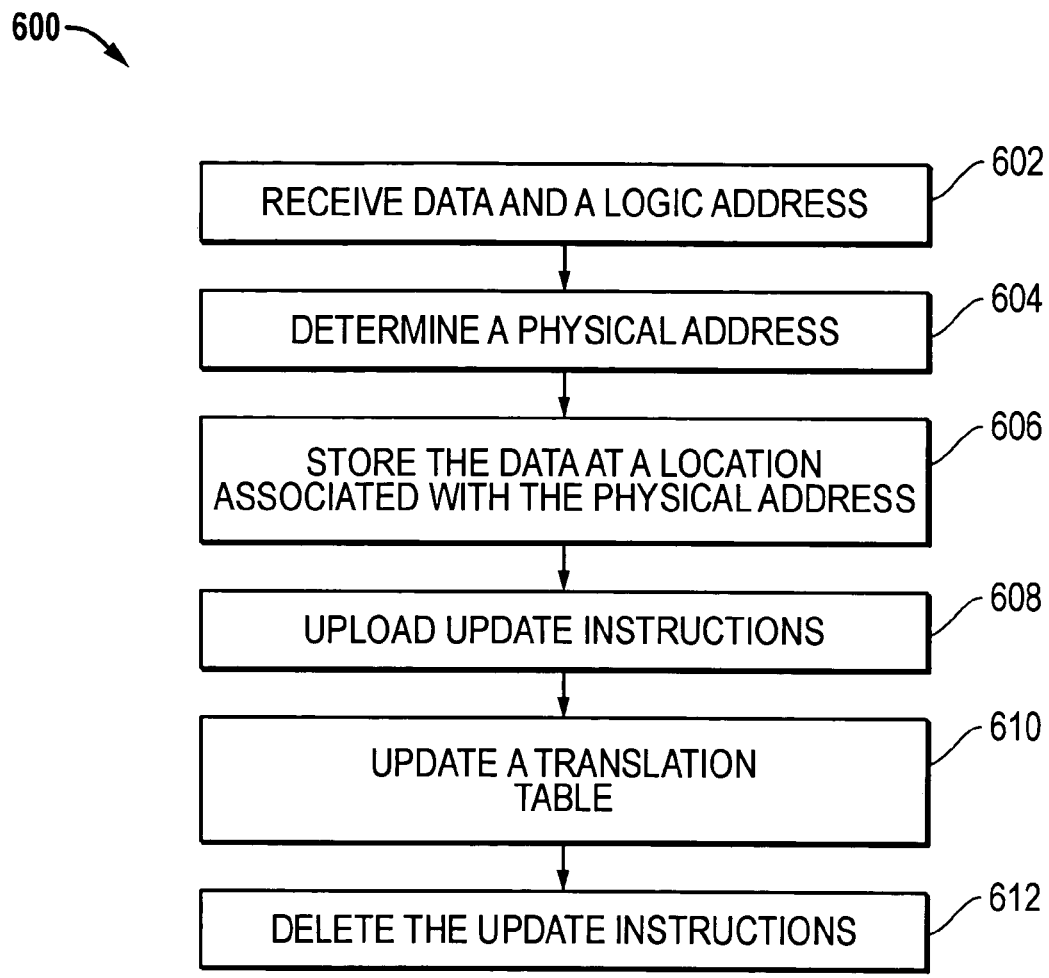

In a further exemplary embodiment, a host device may transfer data to the controller for storage on the non-volatile solid-state memory device. FIG. 6 illustrates an exemplary method 600 for storing data on the non-volatile solid-state memory device. The controller receives data and a logical address at which the data is to be stored, as illustrated at 602. The controller may determine a physical address at which the data is to be stored, as illustrated at 604. In an exemplary embodiment, the logical address may be associated with a physical address and, as such, the controller may access one or more translation tables to determine the physical address associated with the logical address. In an alternative embodiment, the logical address may not be associated with the physical address. As such, the controller may determine which blocks are usable and may select a block to be used based at least in part on balancing algorithms. The selected block is represented by a physical address at which the data is to be stored.

The controller may communicate with the non-volatile solid-state memory device to store the data at a location on the non-volatile solid-state memory device associated with the physical address, as illustrated at 606. For example, the controller may use command sets and communication protocols compatible with the non-volatile solid-state memory device to transfer the data to the non-volatile solid-state memory device for storage at the location indicated by the physical address.

In a particular embodiment, the controller may further access update instructions to update a translation table. In one example, the update instructions are stored in a memory on the controller. In another example, the update instructions are stored on a non-volatile solid-state memory device. As such, the controller may upload the update instructions from the non-volatile solid-state memory device, as illustrated at 608.

In either example, the controller updates the translation table to reflect the relationship between the logical addresses and the physical addresses, as illustrated at 610. For example, the update instructions may be executed to determine an entry within the one or more translation tables associated with the particular logical address. Logical units within the controller may execute the update instructions to store binary bits of at least a portion of the physical address at the particular entry. When the update instructions are stored on the non-volatile solid-state memory device, the controller may delete the update instructions to free random access memory space on the controller after the translation table has been updated, as illustrated at 612.

Figure 7:
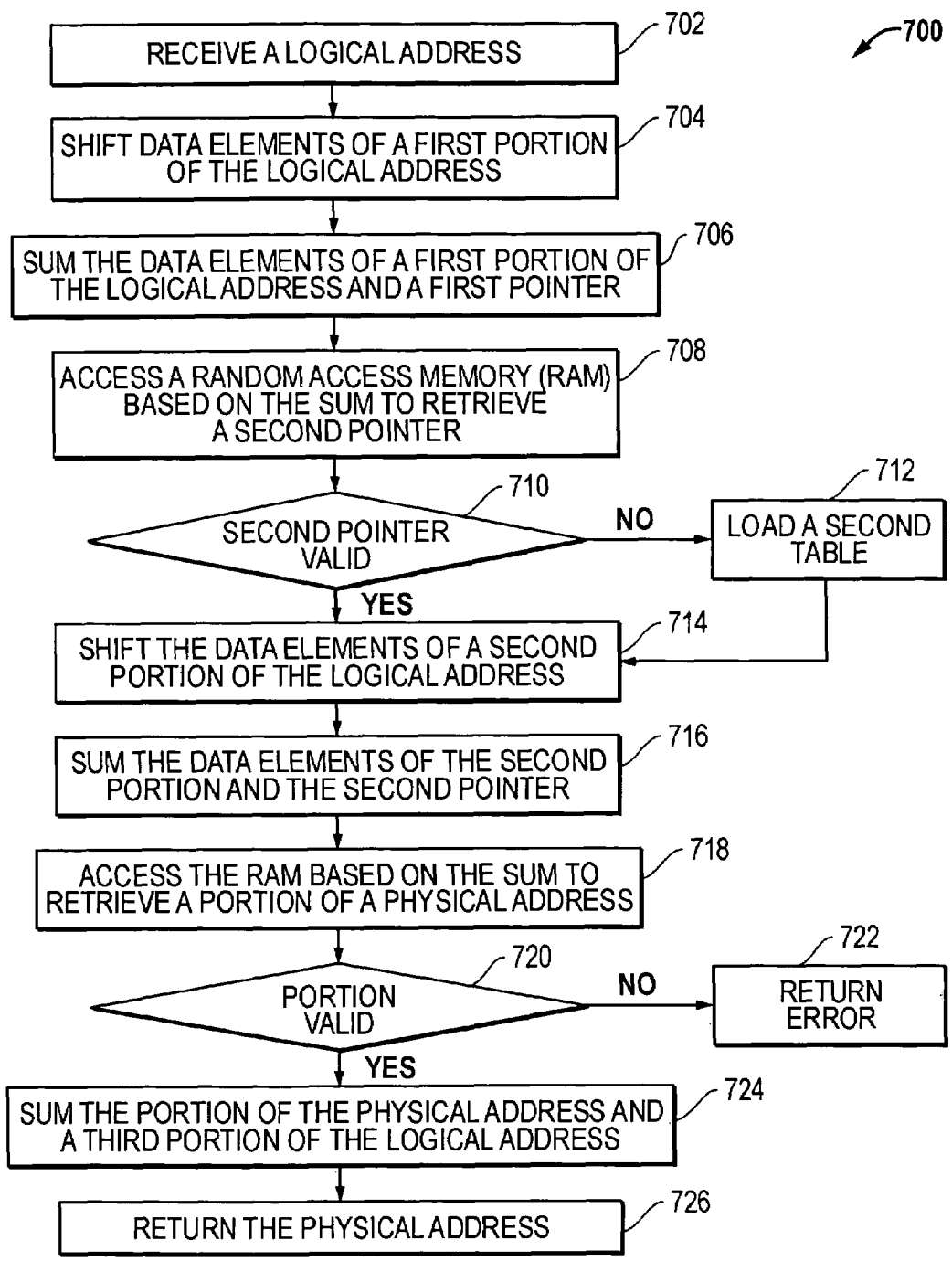

FIG. 7 includes an illustration of a further exemplary method 700. As illustrated at 702, a controller receives a logical address, such as a logical address included in a message. For example, the message may include data for storage, a request to retrieve data, or a direction to delete data. In addition, the message includes the logical address.

To determine a physical address associated with the logical address, translation hardware shifts date elements (e.g., binary data bits) of a first portion of the logical address, as illustrated at 704. For example, a portion of the logical address including the highest significant address bits may be shifted to form the least significant address bits of an address. The shifted binary data bits of the first portion of the logical address may be summed with or appended to a pointer value, as illustrated at 706. The sum may define an address in random access memory (RAM) of an entry of a table. Using the address defined by the sum, the translation hardware may access the random access memory (RAM) to retrieve a second pointer, as illustrated at 708. In a particular embodiment, the second pointer is stored at an entry addressed by the sum.

The translation hardware determines whether the second pointer is valid, as illustrated at 710. For example, the second pointer may form a portion of a second address associated with an entry of a second table. However, when the second table is not in RAM, the pointer may so indicate, such as being NULL or having a designated value. In response, the controller may load the second table into RAM, as illustrated at 712.

Once the second table is in RAM or when the second pointer is valid, the translation hardware may shift date elements (e.g., binary data bits) of a second portion of the logical address, such as shifting the binary data bits to the lowest significant bits of an address, as illustrated at 714. The translation hardware may sum the shifted binary data bits of the second portion of the logical address and the second pointer, as illustrated at 716. Alternatively, the binary data bits may be appended to the second pointer. The sum may define an address of an entry of a second table. Using the sum, the translation hardware may access the second table and the second entry to retrieve a portion of a physical address, as illustrated at 718. Alternatively, the second table may include pointers to a third set of tables, which store portions of physical addresses.

The translation hardware may determine whether the portion of the physical address is valid, as illustrated at 720. When the physical address is not valid, the translation hardware may return an error, as illustrated at 722.

Alternatively, when the physical address is valid, the translation hardware may sum the data elements (e.g., binary data bits) of the portion of the physical address and a third portion of the logical address, as illustrated at 724. For example, the third portion of the logical address may be the offset portion of the logical address. The binary data bits of the portion of the physical address may be shifted to form the most significant bits of an address, such as the block or block and page portions of the physical address, and summed with the binary data bits of the third portion of the logical address. The translation hardware may return the physical address, as illustrated at 726. For example, the translation hardware may store the physical address in a physical address register.

Dedicated hardware implementations including, but not limited to, application specific integrated circuits, programmable logic arrays and other hardware devices can be constructed to implement the methods described herein. Alternatively, portions of the embodiments of the methods may be implemented as one or more software programs, while the remainder of the method is performed by dedicated hardware configured to perform specific portions of the methods.

Although the present specification describes components and functions that may be implemented in particular embodiments with reference to particular standards and protocols, the invention is not limited to such standards and protocols. For example, NAND flash devices, such as single-level cell and multi-level cell flash devices, represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually, and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A controller comprising:
    volatile random access memory including a table having at least one entry, the at least one entry including a significant address bit portion of a physical address of a memory location at a NAND flash non-volatile solid-state memory, the significant address bit portion comprising one of a block portion or a block and page portion; and
    translation hardware, the volatile random access memory accessible to the translation hardware, the translation hardware configured to sum binary data bits of a portion of a logical address and a pointer value to determine a random access memory address of the at least one entry and configured to determine the significant address bit portion of the physical address of the memory location at the NAND flash non-volatile solid-state memory based at least in part on the random access memory address of the at least one entry, wherein the physical address of the memory location is determined by directly appending a designated offset portion of the logical address to the significant address bit portion of the physical address,
    wherein the translation hardware is further configured to update the table by loading and executing software instructions stored at the NAND flash non-volatile solid-state memory.

2. The controller of claim 1, wherein determining the portion of the physical address includes accessing the at least one entry at the volatile random access memory based on the random access memory address and retrieving the portion of the physical address from the at least one entry.

3. The controller of claim 1, further comprising a register accessible to the translation hardware and configured to store a second pointer value.

4. The controller of claim 3, wherein the translation hardware is configured to sum the second pointer value and binary data bits of a second portion of the logical address and is configured to access the volatile random access memory based on the sum of the second pointer value and the binary data bits of the second portion of the logical address to determine the pointer value.

5. The controller of claim 1, wherein the random access memory further includes a second table including a second entry, the second entry including the pointer value.

6. The controller of claim 5, wherein the translation hardware is configured to sum a second pointer value and binary data bits of a second portion of the logical address to determine a second random access memory address, the second random access memory address associated with the second entry.

7. The controller of claim 1, wherein the translation hardware is configured to determine the physical address of the memory location at the NAND flash non-volatile solid-state memory by summing binary data bits of the portion of the physical address and binary data bits of another portion of the logical address.

8. A controller comprising:
    volatile random access memory including a first table and a second table, the first table associated with a first portion of a logical address and including a first entry, the second table associated with a second portion of the logical address and including a second entry, the second entry including a significant address bit portion of a physical address of a location at a flash non-volatile solid-state memory, the significant address bit portion comprising one of a block portion or a block and page portion;
    a register including a reference pointer associated with the first table; and
    translation hardware, the register and the volatile random access memory accessible to the translation hardware, the translation hardware configured to sum the first portion of the logical address and the reference pointer to determine a random access memory address, the random access memory address associated with the first entry, the translation hardware configured to determine the significant address bit portion of the physical address of the location at the flash non-volatile solid-state memory by accessing the second entry based at least in part on the random access memory address of the first entry, wherein the physical address of the location is determined by directly appending a designated offset portion of the logical address to the significant address bit portion of the physical address, wherein the translation hardware is further configured to update the first table and the second table by loading and executing software instructions stored at the flash non-volatile solid-state memory.

9. The controller of claim 8, wherein the first entry includes a second pointer.

10. The controller of claim 9, wherein the volatile random access memory includes software instructions executable to retrieve the second table when the second pointer indicates that the second table is not in the volatile random access memory.

11. The controller of claim 9, wherein the translation hardware is configured to sum the second pointer and the second portion of the logical address to determine a second random access memory address, the second random access memory address associated with the second entry.

12. The controller of claim 11, wherein determining the portion of the physical address includes accessing the second entry based on the second random access memory address.

13. The controller of claim 8, wherein the translation hardware is configured to determine the physical address by summing data elements of the portion of the physical address and of a third portion of the logical address.

14. The controller of claim 8, wherein the volatile random access memory includes software instructions executable to update the first table and the second table in response to writing data to the flash non-volatile solid-state memory.

15. The controller of claim 8, wherein the flash non-volatile solid-state memory is NAND flash non-volatile solid-state memory.

16. A device comprising:
NAND flash non-volatile solid-state memory; and
a controller including:
volatile random access memory including a table having at least one entry, the at least one entry including a significant address bit portion of a physical address of a memory location at the NAND flash non-volatile solid-state memory, the significant address bit portion comprising one of a block portion or a block and page portion; and
translation hardware, the volatile random access memory accessible to the translation hardware, the translation hardware configured to sum binary data bits of a portion of a logical address and a pointer value to determine a random access memory address of the at least one entry at the volatile random access memory and configured to determine the significant address bit portion of the physical address of the memory location at the NAND flash non-volatile solid-state memory based at least in part on the random access memory address of the at least one entry, wherein the physical address of the memory location is determined by directly appending a designated offset portion of the logical address to the significant address bit portion of the physical address,
wherein the translation hardware is further configured to update the table by loading and executing software instructions stored at the NAND flash non-volatile solid-state memory.

17. The device of claim 16, wherein determining the portion of the physical address includes accessing the at least one entry at the volatile random access memory based on the random access memory address and retrieving the portion of the physical address from the at least one entry.

18. The device of claim 16, wherein the controller farther includes a register accessible to the translation hardware and configured to store a second pointer value.

19. The device of claim 18, wherein the translation hardware is configured to sum the second pointer value and binary data bits of a second portion of the logical address and is configured to access the volatile random access memory based on the sum of the second pointer value and the binary data bits of the second portion of the logical address to determine the pointer value.

20. The device of claim 16, wherein the random access memory further includes a second table including a second entry, the second entry including the pointer value.

21. A method of accessing non-volatile solid-state memory, the method comprising:
summing data elements of a first portion of a logical address and a first pointer to determine a first address at a volatile random access memory of a first table entry of a first table;
accessing the volatile random access memory based on the first address to determine a second pointer;
summing data elements of a second portion of the logical address and the second pointer to determine a second address at the volatile random access memory of a second table entry of a second table;
accessing the volatile random access memory based on the second address to determine a significant address bit portion of a physical address of a location at the non-volatile solid-state memory, the significant address bit portion comprising one of a block portion or a block and page portion, wherein the physical address of the location is determined by directly appending a designated offset portion of the logical address to the significant address bit portion of the physical address; and
updating at least one of the first table and the second table by loading and executing software instructions stored at the non-volatile solid-state memory.

22. The method of claim 21, wherein the non-volatile solid-state memory is NAND flash non-volatile solid-state memory.

23. The method of claim 21, further comprising shifting the data elements of the first portion of the logical address prior to summing the data elements of the first portion of the logical address.

24. The method of claim 21, further comprising shifting the data elements of the second portion of the logical address prior to summing the data elements of the second portion of the logical address.

25. The method of claim 21, further comprising retrieving the second table in response to determining the second pointer when the second pointer indicates that the second table is not located at the volatile random access memory.

26. The method of claim 21, further comprising determining the first pointer and the second pointer in response to writing data to the non-volatile solid-state memory.

* * * * *